May 30, 1933.  A. P. BLOXSOM  1,911,599
AUTOMATIC GEAR CHANGING MECHANISM
Filed March 7, 1932   3 Sheets-Sheet 3
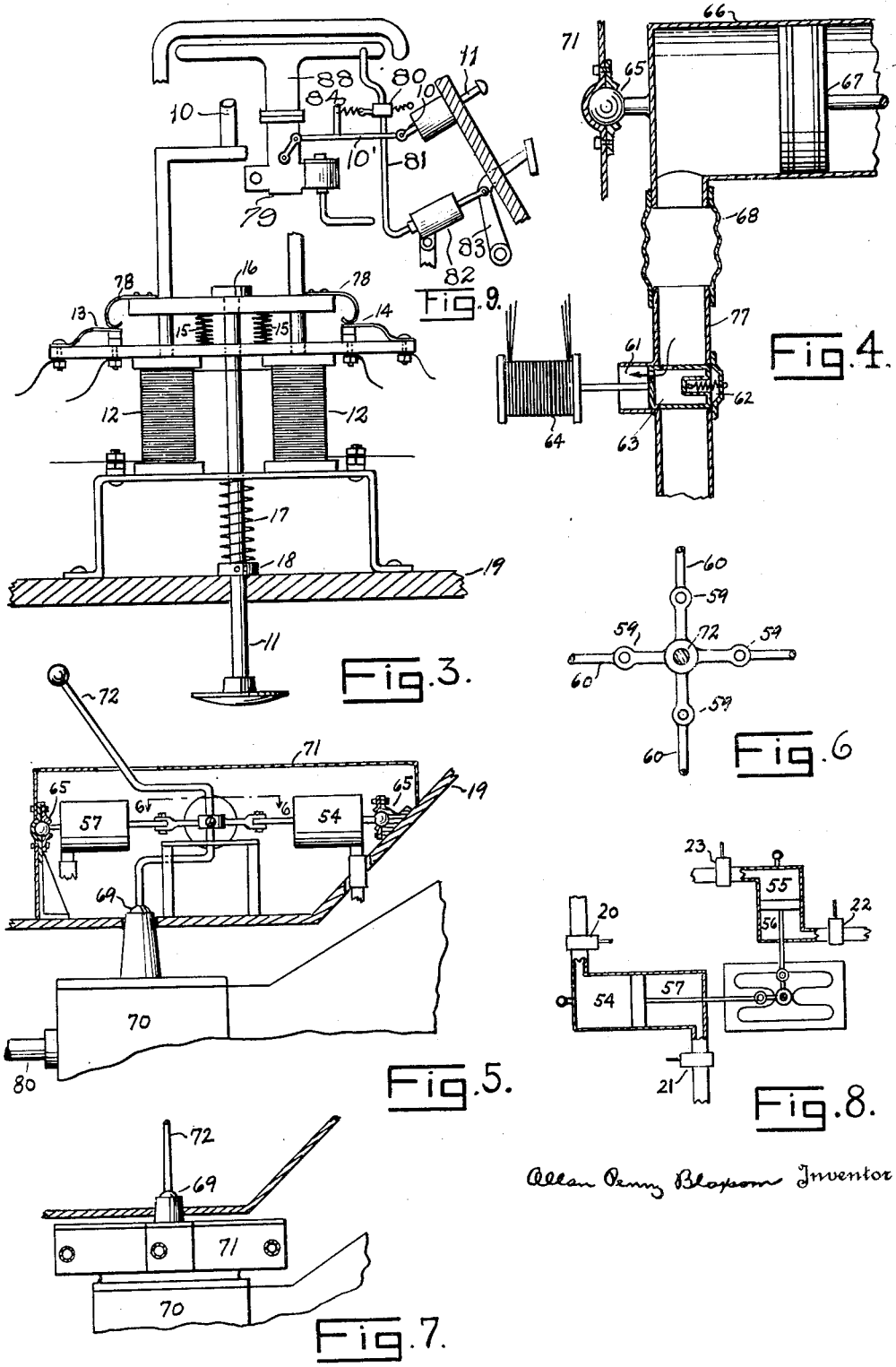
Allan Penny Bloxsom Inventor Patented May 30, 1933

1,911,599

UNITED STATES PATENT OFFICE

ALLAN PENNY BLOXSOM, OF HOUSTON, TEXAS

AUTOMATIC GEAR CHANGING MECHANISM

Application filed March 7, 1932. Serial No. 597,327.

The present invention relates to a gear shifting mechanism especially useful in conjunction with an automobile or any motor vehicle requiring the changing of gears for power transmission, and has for its principal object to provide means for changing the transmission gears to reverse, neutral, or to low through to high as the speed of the vehicle increases.

Another object of the invention is to eliminate the present difficult and unsatisfactory method of shifting gears through the medium of a manually operated gear shift lever, but at the same time retaining the gear shift lever or means to use it should any occasion for its use arise.

A further object is to provide an automatic shifting of gears through all forward speeds dependent entirely upon the forward speed of the vehicle should the operator so elect. The operator also has the privilege of maintaining the gears in certain positions irrespective of the speed of the vehicle until he desires them to be moved.

With the foregoing and other important objects in view the invention consists essentially of a gear box within which are operatively mounted the regular train of gears to effect changes in the speed of operation between a driving element and a driven element. Suitably positionel immediately above the gear box but below the pivoting point of the gear shifting lever as shown in Figure 7, or near the top of the gear shifting lever as illustrated in Figure 5, are either two cylinders as revealed in Figure 8, or two pairs of cylinders as pictured in Figures 1 and 2. In Figures 1 and 2 one pair of cylinders are of only sufficient size to operate pistons or diaphragms operatively attached to the side arms of the gear shifting member. These cylinders with pistons or diaphragms will be hereinafter referred to as the small right and left cylinder and serve the purpose of guiding the gear shifting lever or arm to one side or the other to enable it to engage in the right or left gear shifting fork contained in the gear box. The two large cylinders, as are the two small cylinders, are located opposite each other and contain pistons or diaphragms to operate the anterior and posterior arms of the gear shifting member. These two cylinders are sufficiently large to contain pistons or diaphragms to adequately move the gear shifting lever or arm to effect a change in gears. It will be noted here that for the purpose of simplification in description that the cylinders are illustrated with single acting pistons or diaphragms, but in construction the cylinders can have double acting pistons or diaphragms as revealed in Figure 8, so that the force or vacuum necessary for moving the pistons or diaphragms can be applied to both sides, thereby eliminating one large cylinder and one small cylinder, and reducing materially the working parts. The cylinders containing the pistons or diaphragms are connected through a series of suitable conduits having valves, either to a source of compressed air or to any mechanism appropriate for producing a vacuum such as the intake manifold of a motor vehicle.

Two cylinders, a small cylinder and a large cylinder, operate in conjunction with each other, and the valves to certain pairs of conduits or cylinders are opened electrically at various forward speeds. This is accomplished by means of a switch controlled by some mechanism which varies with the speed of the driven element. In the accompanying diagrams a governor controls this switch, but it can be controlled by a pump. In addition the valves to certain combinations of the cylinders are operated electrically by a hand switch to produce a gear shifting to reverse, neutral or forward speed.

Through the use of an improved accelerator pedal which will be hereinafter described, to be used in conjunction with the automatic clutch throwout mechanism in use in certain cars of today whereby the clutch is thrown out when all pressure is released on the accelerator pedal, means is provided to throw out the clutch and after the gear shifting has been accomplished to reengage the clutch without the operator having to release pressure on the accelerator pedal.

Referring now to the accompanying drawings which illustrate my improved device and in which like characters of reference indicate corresponding parts in each figure:

Figure 3 is a detailed section of the automatic accelerator rod release.

Figure 4 is a detailed section of one of the valves to the conduits; also a detailed section of a cylinder showing piston or diaphragm, and attachment of a cylinder to the housing.

Figure 5 is a section showing a means of mounting cylinders above the pivoting point of the gear shifting lever or arm.

Figure 6 is a detailed section taken substantially on the line 6—6 of Figure 5 looking in the directions of the arrows.

Figure 7 is a section showing the cylinders as mounted in a housing below the pivoting point of the gear shifting lever or arm, the mounting having been shown above the pivoting point in Figure 5.

Figure 8 is a section showing a simplified arrangement and construction of cylinders about the gear shifting lever or arm.

Fig. 9 shows a diagrammatic arrangement of the accelerator and clutch operating mechanism.

Figure 1:
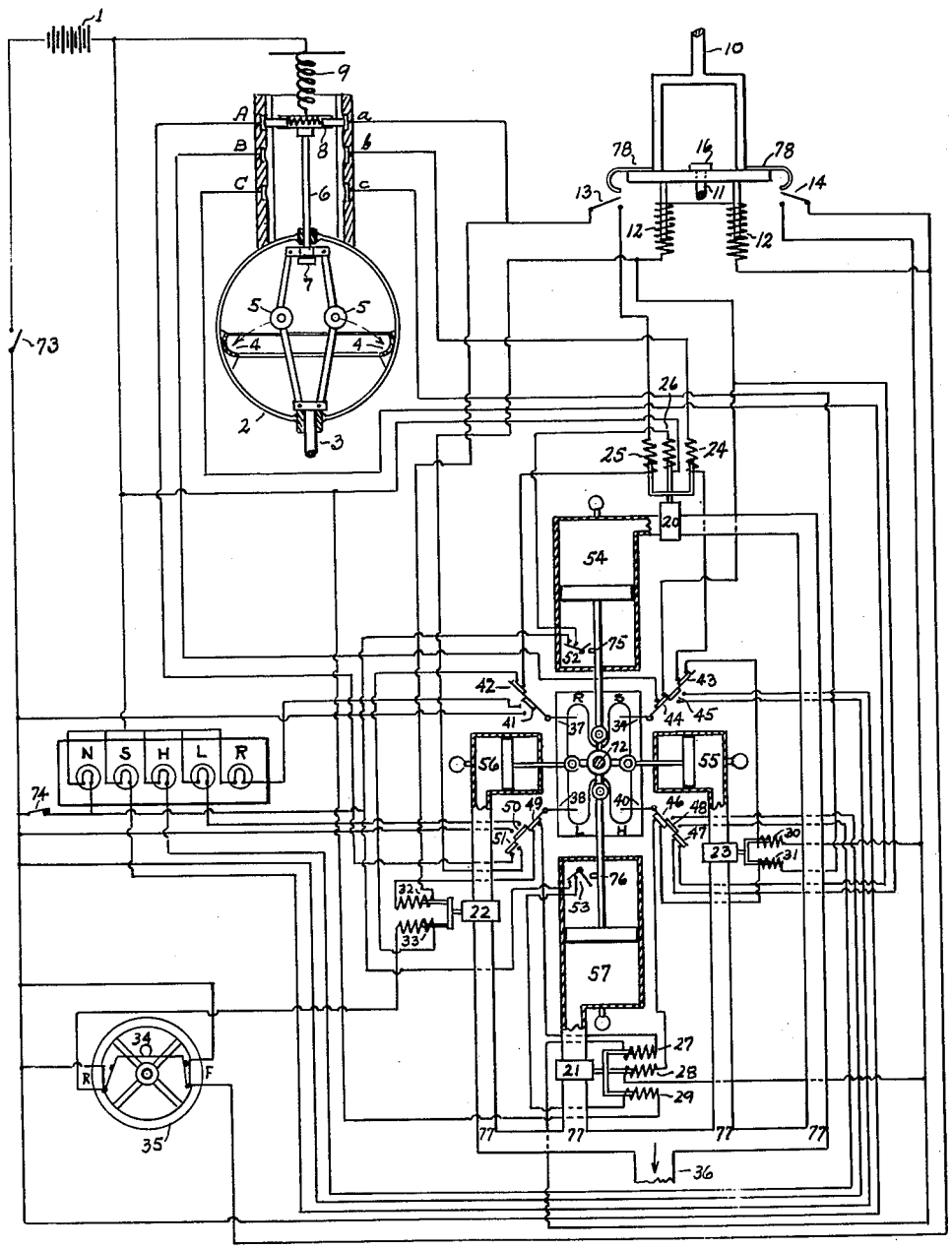
Figure 1 represents, diagrammatically and partly in section, one embodiment of the invention employing a vacuum as a means of moving the gear shifting members.

The assembly consists essentially of a means of providing various electrical circuits in combination with a driven element so that the control of the circuits is accomplished by a sliding switch or distributor which can be moved by a governor attached to the driven element. The electrical circuits consist of two parallel circuits, the main circuit is to effect the disengaging of the clutch by means of releasing automatically all pressure on the accelerator pedal (it being understood that the clutch, as incorporated in various motor vehicles of today, is to be thrown out by releasing all pressure on the accelerator pedal). The clutch having been thrown out the secondary circuit is closed whereby means for shifting of the gears to certain correct locations is accomplished. When the shifting operation is completed both the primary and the secondary circuits are opened by the gears being in position, and a third circuit is closed. The primary circuit now being open by the gears being in an operative position to enable the driving element to act on the driven element, the clutch engages upon movement of the accelerator pedal. The secondary circuit being open no force or vacuum will be acting in the cylinders of the combination of cylinders required for moving the gears to this position. The third circuit is provided to indicate the position of the gears on an instrument board. The switches to control the circuits are the switches 37, 38, 39 and 40 in Figures 1 and 2. These switches are always closed to allow the primary and secondary circuits to be completed with the exception when the gear shifting lever or arm is in position to act on the switches, when the primary and secondary circuits are opened for that position and the indicator contact is closed to show the location of the gear shift lever. When the gear shifting lever or arm leaves the position of the switch, the switch returns to its original position closing the primary and the secondary circuits at this point and opens the indicator circuit for this position. With the above brief general description of the working of the mechanism in mind, a detailed analysis of the intimate working parts will be furnished.

Fig. 9 of the drawings shows a diagrammatic arrangement of one form of automatic clutch which may be used in connection with the invention. It is to be understood that the automatic clutch per se is not a feature of novelty which is claimed by this applicant. The clutch pedal is indicated at 83 and a fluid pressure cylinder at 82. This cylinder, as shown in the drawings, is connected by a pipe 81 to the intake manifold 88 of the motor, which manifold is in turn connected to the carbureter assembly 79. A suitable valve is indicated at 80, which is operable upon movement of the finger 84, which is carried by the rod 10' connected to the accelerator pedal 11. This valve 80 may be so arranged that when pressure is relieved upon the accelerator pedal 11 the valve will open and the suction be applied to the lower end of the cylinder 82 in order to depress the clutch pedal. Suitable springs control the movement of the valve 80 as seen in the drawings.

The automatic accelerator rod release is revealed in Figure 3. The automatic release of pressure on the accelerator rod 10 is accomplished by means of allowing this rod to act instead of forcing it to act. The working parts consist of the conventional rod and pedal 11 placed through floor boards 19 which carry a spring 17 to act on collar 18 which is firmly attached to rod 11. The spring and collar keep the rod 11 elevated when no pressure is applied to the pedal. Rod 11 continues between the two solenoids 12 and 12 and after passing through the bar 78—78 ends in collar 16. Rod 10 is split and attached to the bar 78—78 and acts when the bar 78—78 is moved by the springs 15—15. The bar 78—78 also carries two small side arms which close the switches 13 and 14. Spring 17 is of sufficient strength to overcome the springs 15—15. The force produced by solenoids 12 and 12 is also of sufficient strength to overcome the springs 15 and 15. The two switches 13 and 14 are in the secondary circuits for reverse and forward speeds respectively. Switches 13 and 14 are closed when bar 78—78 is acted upon by the solenoids 12 and 12 or when all pressure has been removed from the rod and pedal 11.

Figure 2:
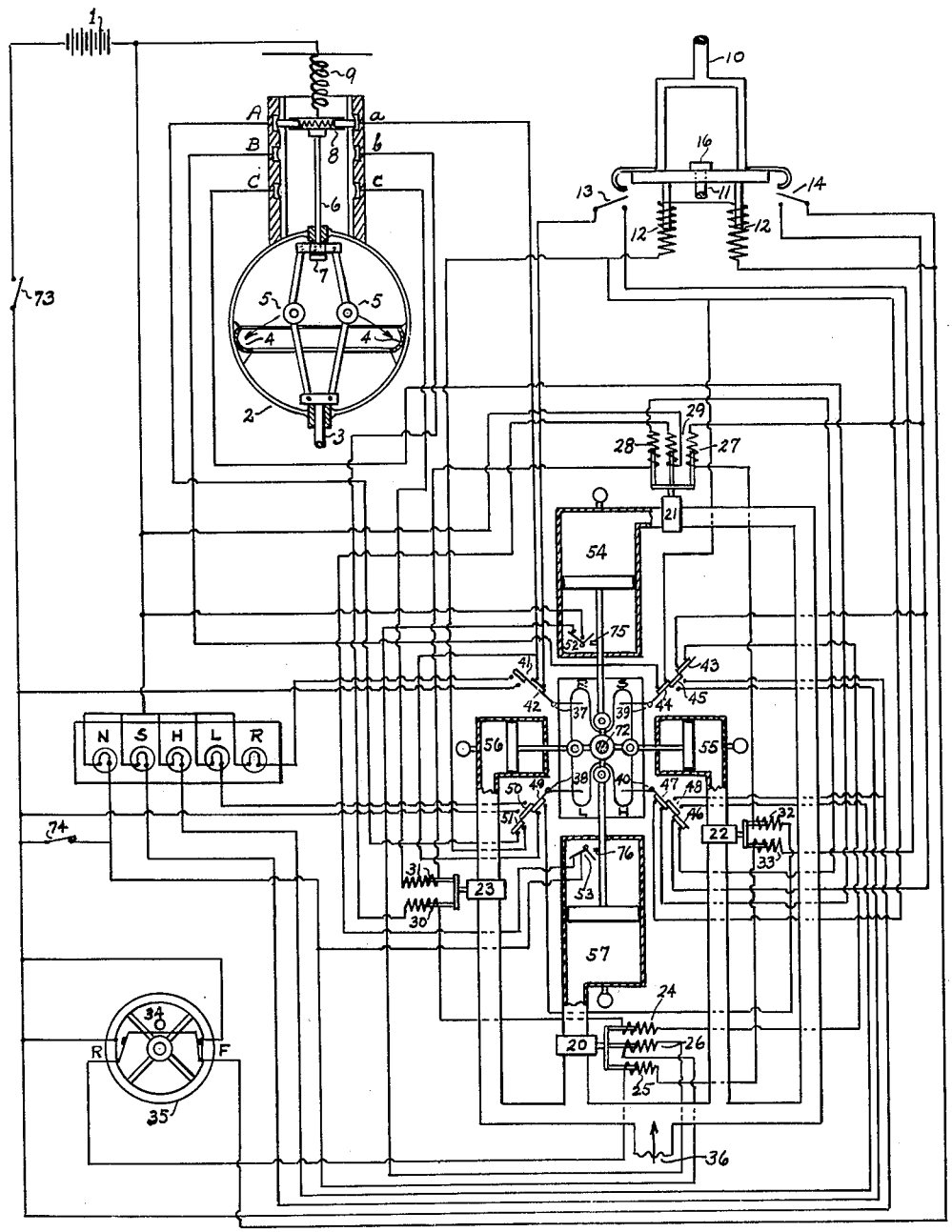
Figure 2 represents, diagrammatically and partly in section, another embodiment of the invention employing compressed air as a means of moving the gear shifting members.

The governor mechanism 2 is pictured in Figures 1 and 2. This consists of a small governor with a housing carrying a runway or groove 4—4 for the weights 5—5 when the propelling shaft 3 driving the governor reaches a certain speed. The propelling shaft 3 is attached to the driven element by means of suitable gearing (not illustrated). The governor acts on the rod 6 at the collar 7. Rod 6 moves the sliding bar or distributor 8 to establish the circuits at A, B, C, (primary circuits), as well as $a$, $b$, and $c$, (secondary circuits). Each contact point is slightly grooved so that the brushes of the sliding bar 8 will catch a little. This is done to prevent the sliding arm from immediately breaking the circuits when the speed of the driven element falls a little due to the driving element being temporarily disconnected by the clutch. The sliding bar or distributor is attached to the spring 9 which serves to work against the force exerted by the governor when the governor is revolving. Spring 9 also carries electrical current from battery 1 through bar 8 to the contact points A, B, C, $a$, $b$, and $c$.

A valve 63 to the conduits or cylinders is pictured in Figure 4. Valves 20 and 21 have solenoids with three windings for three circuits as diagrammatically shown in Figures 1 and 2. Valves 22 and 23 have two windings for two circuits, but can be wound for a third circuit if necessary as hereinafter explained. A small spring 62 keeps the valve 63 closed when no current is passing through the solenoid. When the valves are closed an opening 61 is made between the cylinder and the atmospheric air so that there will be no force working against the piston or diaphragm when it moves in the opposite direction to the force applied in the cylinder. Conduits 77 are attached to the cylinders by means of a flexible tubing 68. The cylinders 66, Figure 4, contain a movable piston or diaphragm 67. Cylinders are attached to the housing 71 by means of a suitable joint 65 to permit of some motion, the joint pictured here is a ball in socket joint.

The cylinders, for the purpose of simplicity in describing the working of the mechanism, are shown and illustrated to have single acting pistons or diaphragms. For the same reason the attachment of the cross member is made above the pivoting point 69 of the gear shift lever 72 as illustrated in Figure 5. Cylinders can be double acting as illustrated in Figure 8 and can be attached below the pivoting point 69 of the gear shift lever or arm 72 as revealed in Figure 7.

Figure 6 is a detailed section taken substantially on the line 6—6 of Figure 5 looking in the direction of the arrows. Rods 60, 60, 60, 60 are to be attached to the pistons or diaphragms, and to the gear shifting lever or arm 72 through movable joints 59, 59, 59 and 59.

Referring now to Figure 1 the various operative steps to produce a shifting of gears employing a vacuum to move the gear shifting lever will be described. The gear shifting mechanism is attached to the gear shifting lever as pictured in Figure 5 so that the various steps will be easily followed. In Figure 1, 1 is a storage battery to supply current to operate the valves 20, 21, 22 and 23. Closure of the ignition key also closes switch 73. Switches 74 and 34 on the steering wheel are always open unless held closed. Closure of switch 34 at R automatically prevents F from being closed and vice versa. NSHLR is an electrical indicator located in a suitable position as on the instrument board, for the purpose of revealing the position of the gears. In NSHLR for the purpose of simplicity in description lights are used, though any electrical signalling device can be employed. N is to indicate neutral, S to indicate second speed forward, H high speed forward, L low speed forward, and R reverse speed.

For the purpose of obtaining forward speed the switch 34 is moved to the right and makes contact at F allowing the primary current to flow through the solenoids 12 and 12 through the contact point 51 to the contact point A through the sliding bar 8 of the governor mechanism to the battery 1. This primary circuit having been completed, the solenoids 12 and 12 act on the bar 78—78 to release all pressure on the accelerator rod 10 which automatically opens the clutch and closes the carburetor. The bar 78—78 being acted upon by the solenoids 12 and 12 closes the switch 14 when the bar is in closed position. Switch 14 being closed the secondary circuit is made through the solenoid 27 of the valve 21, through the contact point 49 of the switch 38, through the solenoid 32 of the valve 22 and on through contact —$a$— through sliding bar 8 of governor mechanism to the battery 1. The valves 22 and 21 being open a vacuum is produced through the conduits 77 and 77 in the cylinders 56 and 57 respectively from the source of vacuum 36 which can be the intake manifold of the motor. A vacuum having been produced in the cylinders 56 and 57 the gear shifting lever is moved to the left to engage with the gear shifting fork and then to position L by means of the piston or diaphragm of cylinder 57, which acts to shift the gears to low speed forward. In position L the gear shifting lever or arm acts on the switch 38 to close the contact point 50 which makes an electrical circuit through L in NSHLR showing that the gears are in low speed forward. Switch 38 being acted upon also opens the contact points 49 and 51. Contact point 51 being opened breaks the primary circuit through the solenoids 12 and 12 of the mechanism for automatically releasing the pressure on the accelerator pedal. Pressure being applied on the rod 11, the rod 10 is allowed to open the carburetor and close or release the clutch. Contact point 49 being open, the valves 22 and 21 are closed, thus relieving the vacuum in the cylinders 56 and 57 respectively.

The mechanism for obtaining second speed forward is as follows: When the driving element drives the driven element at a certain rate of speed—for example to produce a forward speed of 8 miles an hour, the governor 2 having been so attached by its propeller shaft 3 through a chain of gears (not illustrated) to the driven element so that the weights 5—5 revolving at this speed will cause the shaft 6 to act on the bar 8 to move it to contact points B and $b$. The switch 34 being closed at F the primary circuit is again made through the solenoids 12 and 12 through the contact point 44 of the switch 39 to the contact point B, through the sliding bar 8 of the governor mechanism to the battery 1. This primary circuit having been completed, the solenoids 12 and 12 act on the bar 78—78 to release all pressure on the accelerator rod 10 which automatically opens the clutch and closes the carburetor. The bar 78—78 being acted upon by the solenoids 12 and 12 closes the switch 14 when the bar is in closed position. The switch 14 being closed, the secondary circuit is made through the solenoid 30 of the valve 23, through the contact point 43 of the switch 39, through the solenoid 24 of the valve 20, and on through contact —$b$— through the sliding bar 8 of the governor mechanism to the battery 1. The valves 23 and 20 being open a vacuum is produced through the conduits 77 and 77 in the cylinders 55 and 54 respectively from the source of vacuum 36. A vacuum having been produced in the cylinders 55 and 54 the gear shifting lever 72 is moved forward to the right forward position S, which accomplishes the shifting of gears to second speed forward. In position S the gear shifting lever or arm acts on the switch 39 to close the contact point 45 which makes an electrical circuit through S in NSHLR showing that gears are in second speed forward. Switch 39 being acted upon also opens the contact points 44 and 43. Contact point 44 being opened breaks the primary circuit through the solenoids 12 and 12 of the mechanism for automatically releasing pressure on the accelerator pedal. Pressure being applied on the rod 11, the rod 10 is allowed to open the carburetor and to close or release the clutch. Contact point 43 being open, valves 23 and 20 are closed, thus relieving the vacuum in the cylinders 55 and 54 respectively.

The mechanism for obtaining high speed forward is as follows: When the driving element drives the driven element at a certain rate of speed—for example to produce a forward speed of 18 miles an hour, the governor 2 having been so attached by its propeller shaft 3 through a chain of gears (not illustrated) to the driven element so that the weights 5—5 revolving at this speed will cause the shaft 6 to act on the bar 8 to move it to the contact points C and $c$. At this speed of rotation the weights 5 and 5 of the governor mechanism move in the runway 4 and 4 so that at higher speeds of rotation integrity of the governor mechanism will not be destroyed. The switch 34 being closed at F the primary circuit is again made through the solenoids 12 and 12 through the contact point 47 of the switch 40 to the contact point C, through the sliding bar 8 of the governor mechanism to the battery 1. This primary circuit having been completed, the solenoids 12 and 12 act on the bar 78—78 to release all pressure on the accelerator rod 10 which automatically opens the clutch and closes the carburetor. The bar 78—78 being acted upon by the solenoids 12 and 12 closes the switch 14 when the bar is in closed position. Switch 14 being closed the secondary circuit is made through the solenoid 28 of valve 21, through the contact point 46 of the switch 40, through the solenoid 31 of valve 23, on through the contact —$c$— through the sliding bar 8 of the governor mechanism to the battery 1. The valves 21 and 23 being open a vacuum is produced through the conduits 77 and 77 in the cylinders 57 and 55 respectively from the source of vacuum 36. A vacuum having been produced in the cylinders 57 and 55 the gear shifting lever 72 is moved backward to the right rear position H, which accomplishes the shifting of gears to third or high speed forward. In position H the gear shifting lever or arm acts on the switch 40 to close the contact point 48 which makes an electrical circuit through H in NSHLR showing that the gears are in high speed forward. Switch 40 being acted upon also opens the contact points 46 and 47. Contact point 47 being opened breaks the primary circuit through the solenoids 12 and 12 of the mechanism for automatically releasing pressure on the accelerator pedal. Pressure being applied on the rod 11, the rod 10 is allowed to open the carburetor and close or release the clutch. Contact point 46 being open, the valves 21 and 23 are closed, thus relieving the vacuum in the cylinders 57 and 55 respectively.

Should, at any time in the process of the above listed events, the switch 34 be allowed to remain open at F the gear shifting lever will not be moved to a different position. Thus for example should a speed of 35 miles an hour be desired in second speed, the forward switch 34 is allowed to open as soon as second speed has been reached and the gears will remain in second speed forward. Shifting to high speed can be accomplished by closing the switch 34 at F at any speed above 18 miles an hour. Should the driven element stop while the gear shift lever is in high the position or third speed forward, low speed forward can be obtained by closing the switch 74 to shift gears to the neutral position, or by closing the switch 34 at R and then closing at F.

To obtain a neutral position the switch 74 is closed. This completes two parallel circuits, one through the indicator NSHLR at N and the other either through the contact point of the switch 53 to the solenoid 29 of the valve 21 to the battery 1, or depending on the location of the gear shifting lever or arm 72, through the contact point of the switch 52 through the solenoid 26 of valve 20 to the battery 1. When the gear shift lever or arm 72 is in the half way position between R and L, or between S and H, the switches 52 and 53 are held open by means of plungers 75 and 76 respectively so that valves 20 and 21 will be closed. When the lever 72 moves to position R or S the switch 53 is allowed to close so that when switch 74 is closed a circuit can be made through the solenoid 29 of the valve 21, whereby by the opening of the valve 21 a vacuum is produced in cylinder 57. The gear shifting lever or arm will then be moved to the half way position between R and L, or between S and H. When lever 72 moves to position L or H the switch 52 is allowed to close so that when the switch 74 is closed a circuit can be made through the solenoid 26 of valve 20, whereby upon the opening of the valve 20 a vacuum is produced in the cylinder 54. The gear shifting lever or arm will then be moved to the half way position between L and R, or between H and S.

For the purpose of obtaining reverse speed, the switch 34 is moved to the left and makes contact at R allowing a circuit to be completed through solenoid 33 of valve 22, through the contact point 42 of the switch 37, through the solenoid 25 of the valve 20 through the switch 13 when all pressure is relieved on the rod 11 through contact —a— to the sliding bar 8 of the governor mechanism to the battery 1. The valves 22 and 20 being open a vacuum is produced through the conduits 77 and 77 in the cylinders 56 and 54 respectively from the source of vacuum 36. A vacuum having been produced in cylinders 56 and 54 the gear shifting lever is moved to the left to engage with the gear shifting fork and then to position R by means of the piston or diaphragm in the cylinder 54 which act shifts the gears to reverse speed. In position R the gear shifting lever or arm acts on the switch 37 to close the contact point 41 which makes an electrical circuit through R in NSHLR showing that gears are in reverse speed. The switch 37 being acted upon also opens the contact point 42, which closes the valves 22 and 20 thus relieving the vacuum in the cylinders 56 and 54 respectively.

*Use of compressed air for moving gear lever*

Referring now to Figure 2 the various operative steps to produce a shifting of gears employing compressed air to move the gear shifting lever will be described. The gear shifting mechanism is attached to the gear shifting lever as pictured in Figure 5 so that the various steps will be easily followed. In Figure 2, 1 is a storage battery to supply current to operate the valves 20, 21, 22 and 23. Closure of the ignition key closes the switch 73. The switches 74 and 34 on the steering wheel are always open unless held closed. Closure of the switch 34 at R automatically prevents F from being closed and vice versa. NSHLR is an electrical indicator located in a suitable position as on the instrument board, for the purpose of revealing the position of the gears. In NSHLR, for the purpose of simplicity in description, lights are used, though any electrical signalling device can be employed. N is to indicate neutral, S to indicate second speed forward, H high speed forward, L low speed forward, and R reverse speed.

For the purpose of obtaining forward speed the switch 34 is moved to the right and makes contact at F, allowing the primary current to flow through solenoids 12 and 12 through the contact point 51 of switch 38 to contact A through the sliding bar 8 of the governor mechanism to the battery 1. This primary circuit having been completed, the solenoids 12 and 12 act on the bar 78—78 to release all the pressure on the accelerator rod 10 which automatically opens the clutch and closes the carburetor. The bar 78—78 being acted upon by the solenoids 12 and 12 closes the switch 14 when the bar is in closed position. The switch 14 being closed the secondary circuit is made through the solenoid 27 of the valve 21, through the solenoid 32 of the valve 22, through the contact point 49 of the switch 38 to contact —a— through sliding bar 8 of the governor mechanism to the battery 1. The valves 22 and 21 being open, compressed air is allowed to enter the cylinders 55 and 54 respectively from supply of compressed air 36. Compressed air having entered cylinders 55 and 54 the gear shifting lever is moved to the left to engage with the gear shifting fork and then to position L by means of a piston or diaphragm of the cylinder 54, which act shifts the gears to low speed forward. In position L the gear shifting lever or arm acts on switch 38 to close the contact point 50, which makes an electrical circuit through L in NSHLR showing that the gears are in low speed forward. Switch 38 being acted upon also opens the contact points 49 and 51. The contact point 51 being opened breaks the primary circuit through the solenoids 12 and 12 of the mechanism for automatically releasing pressure on the accelerator pedal. Pressure being made on the rod 11, rod 10 is allowed to open the carburetor and close or release the clutch. The contact point 49 being open, valves 22 and 21 are closed, thus allowing the compressed air in cylinders 55 and 54 to escape.

The mechanism for obtaining second speed forward is as follows: When the driving element drives the driven element at a certain rate of speed—for example to produce a forward speed of 8 miles an hour, the governor 2 having been so attached by its propeller shaft 3 through a chain of gears (not illustrated) to driven element so that the weights 5—5 revolving at this speed will cause the shaft 6 to act on the bar 8 to move it to contact points B and *b*. The switch 34 being closed at F the primary circuit is again made through solenoids 12 and 12 through contact point 44 of the switch 39 to the contact point B, through the sliding bar 8 of governor mechanism to the battery 1. This primary circuit having been completed, the solenoids 12 and 12 act on the bar 78—78 to release all pressure on the accelerator rod 10, which automatically opens the clutch and closes the carburetor. The bar 78—78 being acted upon by the solenoids 12 and 12 closes the switch 14 when the bar is in closed position. The switch 14 being closed, the secondary circuit is made through the contact point 43 of the switch 39 through the solenoid 24 of the valve 20 on through the solenoid 30 of valve 23 through contact —*b*— through sliding bar 8 of the governor mechanism to the battery 1. The valves 23 and 20 being open the compressed air is allowed to enter the cylinders 56 and 57 respectively from the supply of compressed air 36. Compressed air having entered the cylinders 56 and 57 the gear shifting lever is moved to the right forward position S, which accomplishes the shifting of gears to second speed forward. In position S the gear shifting lever or arm acts on switch 39 to close the contact point 45 which makes an electrical circuit through S in NSHLR, showing that gears are in second speed forward. The switch 39 being acted upon also opens the contact points 44 and 43. The contact point 44 being opened breaks the primary circuit through the solenoids 12 and 12 of the mechanism for automatically releasing pressure on the accelerator pedal. Pressure being made on the rod 11, the rod 10 is allowed to open the carburetor and close or release the clutch. Contact point 43 being open, the valves 23 and 20 are closed, thus allowing the compressed air in the cylinders 56 and 57 to escape.

The mechanism for obtaining high speed forward is as follows: When the driving element drives the driven element at a certain rate of speed—for example to produce a forward speed of 18 miles an hour, the governor 2 having been so attached by its propeller shaft 3 through a chain of gears (not illustrated) to the driven element so that the weights 5—5 revolving at this speed will cause the shaft 6 to act on the bar 8 to move it to the contact points C and *c*. At this speed of rotation the weights 5 and 5 of the governor mechanism move in the runway 4 and 4 so that at higher speeds of rotation the integrity of the governor mechanism will not be destroyed. The switch 34 being closed at F the primary circuit is again made through solenoids 12 and 12 through the contact point 47 of the switch 40 to contact point C, through the sliding bar 8 of the governor mechanism to the battery 1. This primary circuit having been completed, the solenoids 12 and 12 act on the bar 78—78 to release all pressure on the accelerator rod 10 which automatically opens the clutch and closes the carburetor. The bar 78—78 being acted upon by the solenoids 12 and 12 closes the switch 14 when the bar is in closed position. The switch 14 being closed the secondary circuit is made through the contact point 46 of switch 40, through the solenoid 28 of the valve 21, through the solenoid 31 of the valve 23, and on through the contact —*c*— through the sliding bar 8 of the governor mechanism to the battery 1. The valves 21 and 23 being open compressed air is allowed to enter the cylinders 54 and 56 respectively from the supply of compressed air 36. Compressed air having entered the cylinders 54 and 56 the gear shifting lever is moved to the right rear position H, which accomplishes the shifting of gears to third or high speed forward. In position H the gear shifting lever or arm acts on switch 40 to close the contact point 48 which makes an electrical circuit through H in NSHLR showing that gears are in high speed forward. The switch 40 being acted upon also opens the contact points 46 and 47. The contact point 47 being opened breaks the primary circuit through the solenoids 12 and 12 of the mechanism for automatically releasing pressure on the accelerator pedal. Pressure being made on the rod 11, the rod 10 is allowed to open the carburetor and close or release the clutch. The contact point 46 being open, valves 21 and 23 are closed, thus allowing the compressed air in the cylinders 54 and 56 to escape.

Should, at any time in the process of the above listed events, switch 34 be allowed to remain open at F, the gear shifting lever will not be moved to a different position.

Thus, for example, should a speed of 35 miles an hour be desired in second speed, the forward switch 34 is allowed to open as soon as second speed has been reached and the gears will remain in second speed forward. Shifting to high speed can be accomplished by closing the switch 34 at F at any speed above 18 miles an hour. Should the driven element stop while the gear shift lever is in high position or third speed forward, low speed forward can be obtained by closing the switch 74 to neutral position and then moving the switch 34 to F, or first moving switch 34 to R and then to F.

To obtain a neutral position the switch 74 is closed. This completes two parallel circuits, one through the indicator NSHLR at N and the other either through the contact point of the switch 53 to the solenoid 29 of the valve 21 to the battery 1, or depending on location of the gear shifting lever or arm 72, through the contact point of the switch 52 through the solenoid 26 of the valve 20 to the battery 1. When the gear shift lever or arm 72 is in the half way position between R and L, or between S and H, the switches 52 and 53 are held open by means of plungers 75 and 76 respectively so that the valves 20 and 21 will be closed. When the lever 72 moves to the position R or S switch, switch 53 is allowed to close so that when the switch 74 is closed the circuit can be made through the solenoid 29 of the valve 21, whereby, by the opening of the valve 21, compressed air is allowed to enter the cylinder 54. The gear shifting lever or arm will then be moved to the half way position between R and L, or between S and H. When the lever 72 moves to the position L or H the switch 52 is allowed to close so that when the switch 74 is closed the circuit can be made through the solenoid 26 of the valve 20, whereby, by the opening of valve 20, compressed air is allowed to enter the cylinder 57. The gear shifting lever or arm will then be moved to the half way position between L and R, or between H and S. In construction it might be necessary to have the cylinders 55 and 56 constructed to act in conjunction with the cylinders 54 and 57 to center the gear shifting lever in the exact center instead of the half way position. This can be accomplished easily by means of appropriate switches and attachments to shafts of the pistons or diaphragms of these two cylinders similar to those of the cylinders 54 and 57.

For the purpose of obtaining reverse speed, the switch 34 is moved to the left and makes contact at R, allowing a circuit to be completed through the solenoid 25 of the valve 20, through the solenoid 33 of the valve 22 through the switch 13 through the contact point 42 of the switch 37, through the contact —a— to the sliding bar of the governor mechanism to the battery 1. The valves 20 and 22 being open compressed air is allowed to enter the cylinders 57 and 55 respectively from the supply of compressed air 36. Compressed air having entered the cylinders 57 and 55 the gear shifting lever is moved to the left forward position R, which act shifts the gears to reverse speed. In position R the gear shifting lever or arm acts on the switch 37 to close the contact point 41 which makes an electrical circuit through R in NSHLR showing that the gears are in reverse speed. The switch 37 being acted upon also opens the contact point 42 which closes the valves 20 and 22 thus allowing the compressed air in the cylinders 57 and 55 to escape.

As many changes could be made in the above construction, such as the employment of double acting cylinders as pictured in Figure 8, located below pivoting point of the gear shifting lever or arm as pictured in Figure 7, and the use of either pistons or diaphragms in the cylinders, and many other apparently widely different embodiments of my invention, within the scope of the claims, constructed without departing from the spirit or scope thereof, it is intended that all matter contained in the accompanying specifications and drawings shall be interpreted as illustrative of the possibilities of the combinations of different parts, and not in a limiting sense as to the combinations illustrated.

Having thus described several of the embodiments of my invention, what I claim new and desire to secure Letters Patent on is:

1. In combination with a self-propelled vehicle having a driving element and a driven element with a variable speed gearing connecting such driving and driven elements, and having an automatic clutch releasable upon release of all pressure on the accelerator pedal and also having a gear shifting element suitable for engaging the gear shifting forks to effect changes in the gear ratios between the driving and the driven elements, of an electrically operated means connected with and for automatically releasing and allowing pressure to act on the accelerator pedal, and electrical circuits controlling the movement of said gear shifting element, said circuits being adapted to be opened and closed by the accelerator pedal.

2. The combination, in a self-propelled vehicle, having a driving element and a driven element, with a variable speed gearing connecting the driving element and driven element, a clutch, means for opening the clutch upon release of all pressure on the accelerator pedal, a gear shifting element suitable for engaging in gear shifting forks to effect changes in the gear ratios between the driving element and the driven element, of an electrically operated means for automatically releasing and allowing pressure to act on the accelerator pedal, a speed responsive governor controlled mechanism attached to the vehicle motor and including an electrical distributor, a sliding bar and brushes and contacts, and a housing for said governor furnishing a means for it to cease its function when the driving shaft of said governor reaches a predetermined speed.

3. The combination, in a self-propelled vehicle, having a driving element and a driven element with variable speed gearing connecting said driving element and said driven element, an automatic clutch including means for opening the clutch upon release of all pressure on the accelerator pedal, an electrically operated means for automatically releasing and allowing pressure to act on the accelerator pedal, a gear shifting element suitable for engaging in the gear shifting forks to effect changes in gearing between said driving element and said driven element, and of cylinders with a movable element therein which is operatively attached to said gear shifting element and said element being connected by means of valves and conduits to a source of pressure, a speed responsive governor controlled mechanism including an electrical distributor, an electrical indicator of the position of said gear shifting element, a plurality of circuits connected between said electrical distributor, said valves to the cylinders or conduits, and means for making and breaking said circuits so that said driving element can operate said driven element in reverse, neutral, or in any one of a plurality of advancing speeds through the automatic moving of said gear shifting element by said automatic clutch.

4. In a gear shifting assembly for vehicles, means to change the gear ratio, a plurality of fluid pressure cylinders connected to said means, valves controlling the entrance and exit of pressure to said cylinders, and electrical means operable upon movement of the accelerator and the driven element of the vehicle whereby said valves will be operated in accordance with the speed of the vehicle upon movement of the accelerator pedal.

5. In combination with an automatic gear shift and clutch control assembly, an accelerator including a solenoid, a switch adapted to be closed and opened by said accelerator, and means operable upon movement of said solenoid to actuate said gear shift and clutch control.

6. In an automatic gear shift construction for vehicles, a gear shifting element, a mechanism to shift said element laterally, a mechanism to shift said element longitudinally to perform the gear shifting, and means operable in combination with the speed of the vehicle and the movement of the accelerator pedal to actuate said mechanism.

7. In a gear shifting mechanism, fluid pressure means to shift the gears to provide different gear ratios between the driving and driven elements, valves controlling the flow of fluid pressure to said means, and combination electric circuits controlling electric responsive means to operate said valves, said circuits being opened and closed in response to the speed of the vehicle and the movement of the accelerator of such vehicle.

In testimony whereof I have affixed my signature.

ALLAN PENNY BLOXSOM.